United States Patent [19]

Kashigi et al.

[11] 4,325,075
[45] Apr. 13, 1982

[54] DIGITAL TELEVISION VIDEO SIGNAL STORAGE SYSTEM

[75] Inventors: Kazuo Kashigi; Toshitake Kouyama, both of Tokyo, Japan

[73] Assignee: Nippon Electric Co., Ltd., Tokyo, Japan

[21] Appl. No.: 186,209

[22] Filed: Sep. 11, 1980

[30] Foreign Application Priority Data

Sep. 11, 1979 [JP] Japan .................................. 54-116490

[51] Int. Cl.³ ........................ H04N 9/02; H04N 9/491
[52] U.S. Cl. .................................................. 358/13
[58] Field of Search ..................... 358/4, 12, 13, 17-20

[56] References Cited

U.S. PATENT DOCUMENTS 4,007,486  2/1977  Inaba et al. ........................... 358/13

Primary Examiner—Robert L. Richardson
Attorney, Agent, or Firm—Hopgood, Calimafde, Kalil, Blaustein & Judlowe

[57] ABSTRACT

A digital television video signal storage system wherein the required memory capacity is reduced and memory utilization efficiency increased by reducing the number of bits in an imaginary vertical memory address without effectively increasing the number of bits in an imaginary horizontal address.

5 Claims, 7 Drawing Figures

DIGITAL TELEVISION VIDEO SIGNAL STORAGE SYSTEM

FIELD OF THE INVENTION

This invention relates to a digital television video signal storage system and, more particularly to a circuit configuration for minimizing the storage capacity of a memory used in such a storage system.

DESCRIPTION OF THE PRIOR ART

One example of a digital television video signal storage system is the television signal synchronizing conversion system, known as a frame synchronizer and described in U.S. Pat. No. 3,909,839 entitled "A PHASE LOCKING SYSTEM FOR TELEVISION SIGNALS USING DIGITAL MEMORY TECHNIQUES", and described in an article entitled "Television Frame Synchronizer" published in the Journal of SMPTE, Vol. 84, No. 3 (March 1975), pp. 129–134. In such frame synchronizers, a horizontal/vertical (H/V) mixed address system is employed for providing write-in address data and read-out address data. In a frame synchronizer for an NTSC color television signal, it is possible to construct a memory having minimum storage capacity by utilizing the H/V mixed address system, i.e., the efficiency of utilization for the memory can be very high.

However, a PAL/SECAM color television system, having 625 scanning lines per frame and 50 frames per second, the efficiency of utilization for the memory is very low.

It is, therefore, an object of this invention to provide a digital television video signal storage system in which the efficiency of utilization for the memory is very high.

SUMMARY OF THE INVENTION

In accordance with the invention, there is provided a storage system for a color television signal, said color television signal including horizontal and vertical synchronizing signals and a color subcarrier, said system comprising:

memory means responsive to write-in address data for storing said color television signal, said memory means including a plurality of memory blocks;

means responsive to said horizontal and vertical synchronizing signals and said color subcarrier for producing said write-in address data; and means for producing read-out address data, the stored television signal being read out in response to said read-out address data;

said write-in address data producing means including:

means responsive to said vertical synchronizing signal for producing write-in vertical address data;

means for multiplying said write-in vertical address data by a predetermined amount;

memory-block selecting counter means for producing memory block selecting data, said television signal being written into a particular memory block selected by said memory-block selecting data; and memory address counter means for loading output data from said multiplying means at a rate equal to a period of said horizontal synchronizing signal and for counting memory addresses at a rate equal to a period of said memory-block selecting counter.

Other features and advantages of this invention will be understood from the following detailed description in conjunction with the accompanying drawings.

DETAILED DESCRIPTION

Figure 1:
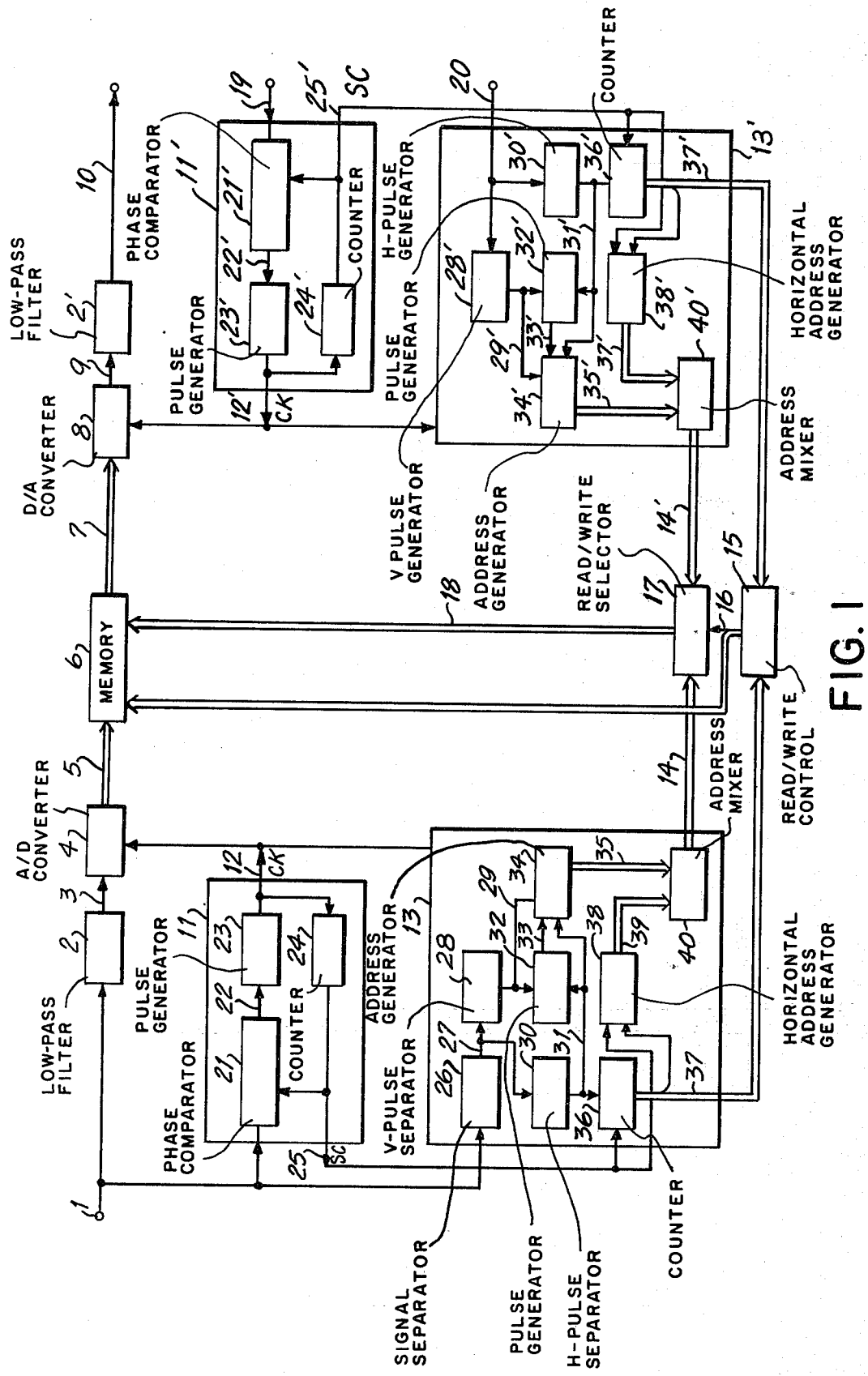
FIG. 1 is a block diagram of a conventional frame synchronizer in an NTSC television system.

Referring to FIG. 1, there is illustrated a block diagram of a frame synchronizer in an NTSC television system. An input television picture signal is supplied through a video signal input terminal 1 to a low pass filter 2 where undesirable high frequency components of the input signal are removed. The filtered input signal is samples in A/D converter 4, at a frequency 10.7 MHz, which is three times higher than the input burst frequency converted into PCM parallel 8-bit data and applied to signalling path 5. A write clock pulse 12 and a write subcarrier pulse 25, which are synchronized with the color burst of the input signal, are formed by BCO 11 comprised of a burst gate/phase comparator 21, a clock pulse generator 23 and a divided by 3 counter 24. Write in address data 14, synchronized with a synchronizing signal from the input signal, is formed by write address generator 13. The parallel 8-bit data on signalling path 5, from one frame period, is written into storage locations in elastic digital memory 6 designated by write-in address data 14. Digital memory 6 has a storage capacity of approximately 2.4 million bits.

Read-out clock pulse 12' and read-out subcarrier pulse 25', synchronized with an external subcarrier input signal 19, are formed by read clock generator 11'. Read-out address data 14', synchronized with the external synchronizing input signal 20, is formed by read-out address generator 13'. In response to the read-out address data and the read-out clock, the PCM data stored in memory 8 is read-out, converted into a PAM signal and applied to signalling path 9 by D/A converter 8. The PAM signal on signalling path 9 is applied to low pass filter 2' where spurious high frequency components are filtered out. In this way, a television signal 10 is obtained which is synchronized with reference signals 19 and 20.

In write-in address generator 13, a composite synchronizing signal 27 is separated from composite television signal 1 by a synchronizing signal separator 26. Also, a vertical (V) pulse 29 and a horizontal (H) pulse 31 are separated from the composite synchronizing signal 27 by V pulse separator 28 and H pulse separator 30, respectively. A frame pulse 33 is formed from V pulse 29 and H pulse 31 by frame pulse generator 32. Vertical address data 35 is formed from frame pulse 33, V pulse 29, and H pulse 31 by vertical address generator 34. In the embodiment of the frame synchronizer being described memory 6 consists of n separate memory cards, where n is equal to 6. Assume that three samples of the 8-bit parallel data on signalling path 5, (i.e., the data for one subcarrier cycle) are written into the first memory card, data for the next subcarrier cycle is written into the second memory card etc., and in this way the same amount of data is written into each of the subsequent memory cards up to card n by the same write-in address data 14. Each memory cards is divided into three memory blocks, A, B and C. Each block has 8 ICs to allow the dta to be stored in an 8-bit parallel format. The 8-bit parallel data, consisting of three samples for each memory card is written in the respective blocks A, B and C by the same write-in address data 14.

An H/V mixed address system has been used in FIG. 1 for eliminating the necessity for assignment of memory capacity to most of a horizontal blanking period and a vertical blanking period. The system provides memory address information on signalling path which permits the use of a smaller memory capacity. Memory smaller card write-in selecting address data is applied to signalling path 37 to make the n successive memory cards subject to a write-in operation during a period of one subcarrier cycle. The address data is formed from H pulse 31 and the write subcarrier pulse 25 by card selecting counter 36. The write address data on signalling path 14 is changed by one after one cycle of the write-in sequence for the n memory cards, that is, horizontal address data on signalling path 39 changes depending on the memory card selecting address data on signalling path 37 and the write-in subcarrier pulse 25 in horizontal address generator 38. The vertical address data on signalling path 35 and the horizontal address data on signalling path 39, are mixed by H/V address mixer 40 to form write-in address data applied to signalling path 14.

Similarly, a read address generator 13' forms read-out address data on signalling 14' and memory card read-out selecting address data on signalling path 37. By using the memory card write-in selecting address data on signalling path 37 and the memory card read-out selecting address data on signalling path 37', a read-/write control circuit 15 forms read/write control pulses on signalling path 16 which are used for read-out and write-in sequence control of the n memories. A read-/write selector 17 in response to the read/write control pulse on signalling path 16, transforms the write-in address data on signalling path 14 into memory addresses on path 18, while in the write-in mode, and it transforms the read-out address data on path 14' into memory addresses on path 18 while in the read-out mode.

Figure 2:
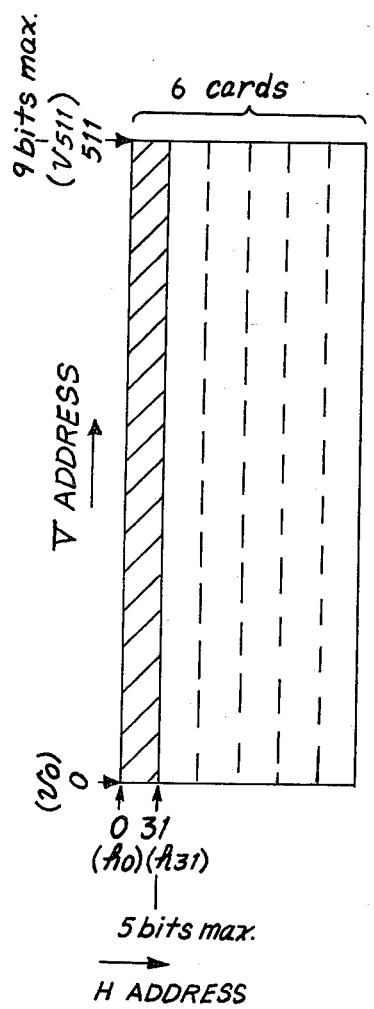
FIG. 2 illustrates the memory addressing scheme in the conventional frame synchronizer shown in FIG. 1.

A prior art memory addressing scheme for the H/V mix address system is illustrated in FIG. 2. For one frame of a television signal, consisting of 525 lines/60 Hz, a minimum memory capacity for storing 512 scanning lines, each of which is 53.6 μs is 2.359296 M bits [(512 lines×53.6×10⁻⁶)÷(1/3.58×10⁶)×3×8 bits]. The minimum memory capacity, 2.359296 M bits, may be constructed by using six memory cards, each card including 24 memory circuits, each memory circuit having a capacity of 16.384 K bits. A satisfactory memory construction is obtained since the 16.384 K bit circuit has a word address of 14 bits (9+5 bits) with 9 bits ("0" to "511") being assigned to the vertical address and 5 bits ("0" to "31") being assigned to the horizontal address. The television signal from every subcarrier cycle, i.e., the three discussed above, are stored in three blocks of the memory card, that is to say, the write-in operation for the three memory circuit blocks are performed with one horizontal address. Thus, in the case of the NTSC system shown in FIG. 2, a device of minimum capacity may be realized with a conventional H/V mixed address system.

Figure 3:
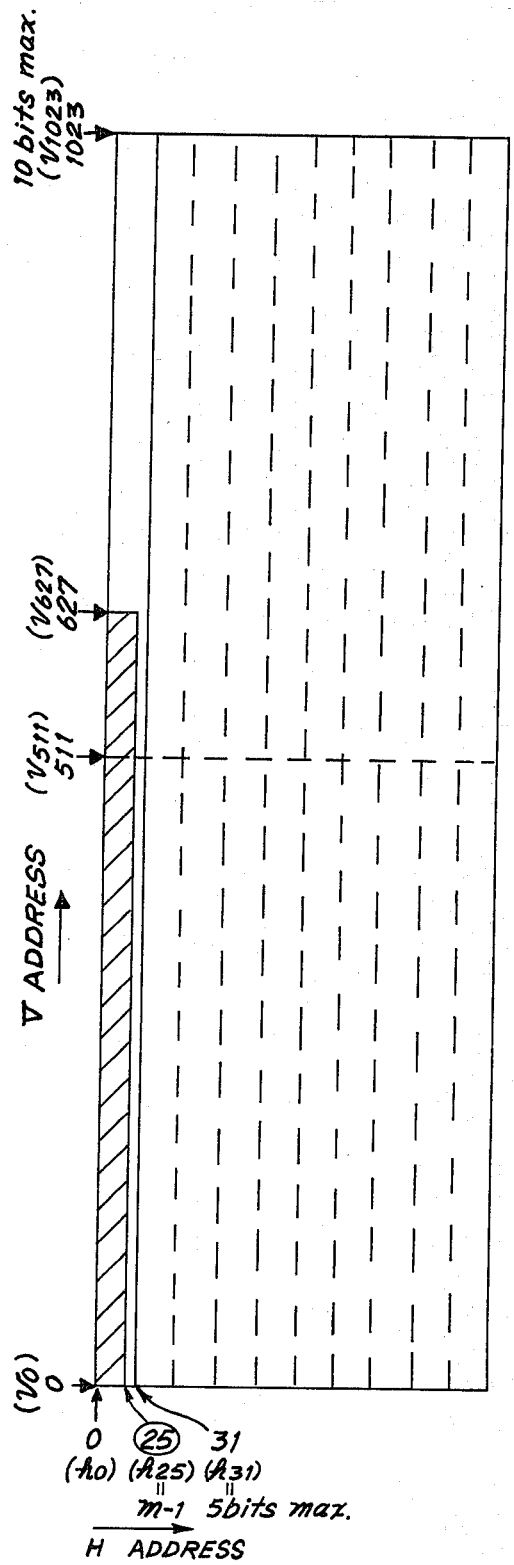
FIG. 3 illustrates a memory addressing in a PAL/SECAM television system.

FIG. 3 shows a memory addressing scheme for the case of a PAL or SECAM color television system. As in the case of the NTSC system the sampling frequency of the A/D converter is 13.3 MHz, which is three times the subcarrier frequency 4.43 MHz, and the PCM data from the A/D converter is in an 8-bit parallel format. In a PAL television system having 625 lines/50 Hz, the picture information from two fields is stored during a period excluding the vertical blanking period, and vertical interval test signals (VITS) in the vertical blanking period are also stored. Accordingly, the memory capacity necessary for storing 628 scanning lines, each of 58.6 μs, is 3.912664 M bits [(628×58.6×10⁻⁶)÷(1/4.43×10⁶)×3×8 bits]. The minimum number n of memory cards necessary to store 393.216 K bits i.e., each memory card having 24 memory circuits and each memory circuit storing 16.384 K bits, is $$3.912664 \times 10^6 = 393.216 \times 10^3 \times n$$
$$\therefore n = 10$$

The 16.384 K bit circuit has a word address of 14 bits; however, the vertical address ranges from 0 to 627 and needs 10 bits while the horizontal address ranges from 0 to 25 and needs 5 bits. Thus, when the H/V mixed address system is employed for the address formation, a total of 15 bits are necessary. As a result, 20 memory cards, rather than 10 memory cards are needed. Further, utilization efficiency for the memory is:

$$(3.912664 \times 10^6 / 393.216 \times 10^3 \times 20) \times 100 = 49.7\%$$

Such utilization memory efficiency is extremely low.

In FIG. 3, in which a horizontal address axis along the abscissa is represented by h and a vertical address axis along the ordinate is represented by v, the memory capacity of the first memory card is equal to an area enclosed by four coordinates (h0, v0), (h31, v0), (h31, v511), and (h0, v511). However, the memory area actually used is merely the area enclosed by coordinates (h0, v0), (h25, v0), (h25, v511), and (h0, v511). As seen from FIG. 3, the portion of the memory along horizontal address axis h, ranging from h26 to h31, is not used.

The memory capacity of the 11th memory card is a memory area enclosed by four coordinates (h0, v512), (h31, v512), (h31, v1023) and (h0, v1023). However, the area actually used is merely the area enclosed by coordinates (h0, v512), (h25, v512), (h25, v627) and (h0, v627). Area not used in the first memory card can be calculated as follows:

$$(h31 - h25) \times (v511 + 1) = (31 - 25) \times (511 + 1) = 3072$$

Similarly memory area used in the 11th card is:

$$(h25 + 1) \times (v627 - V511) = (25 + 1) \times (627 - 511) = 3016$$

Therefore, the area not used by the first memory card is larger than that actually used in the 11th card, a very poor showing of efficient memory utilization.

When considering the above and considering a memory circuit of 16.384 K bits with a 14 bit address, it is seen that the utilization efficiency of the abscissa is insufficient through the horizontal address is 5 bits, and that the vertical address of 10 bits is larger than 9 bits (14−5). As a consequence, the utilization efficiency in the horizontal address axis and the vertical address axis is not balanced. This unbalance causes the above-described low memory efficiency.

In brief, the present invention involves a method in which the utilization efficiency in the horizontal address axis direction is improved without effectively increasing the number of bits of an imaginary horizontal address x whereby the number of bits of an imaginary vertical address y are reduced, eliminating the use of the 11th and subsequent memory cards.

Figure 4A:
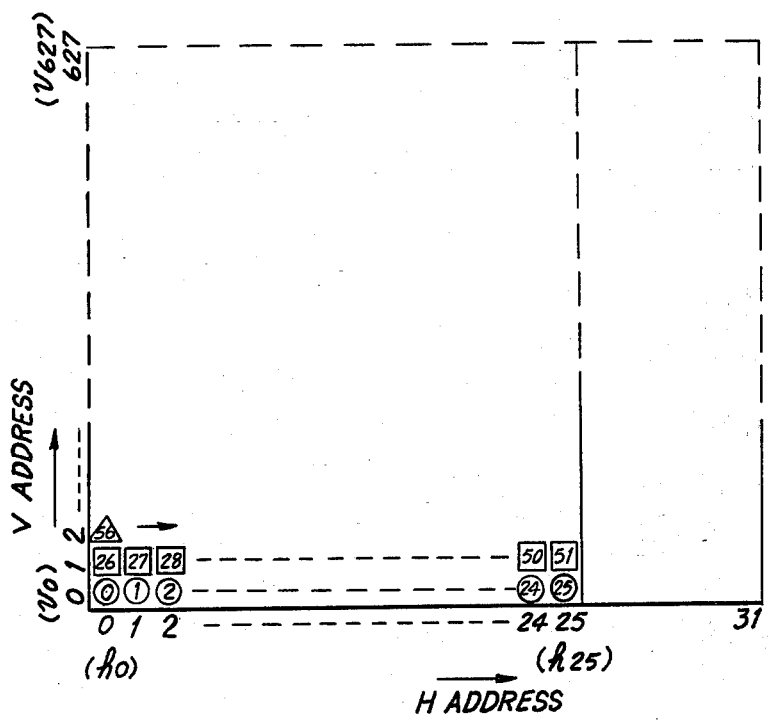
FIGS. 4(a) and 4(b) comparatively illustrate memory address updatings useful in explaining the operation of the prior art shown in FIG. 3 and the operation of the present invention.
Figure 4B:
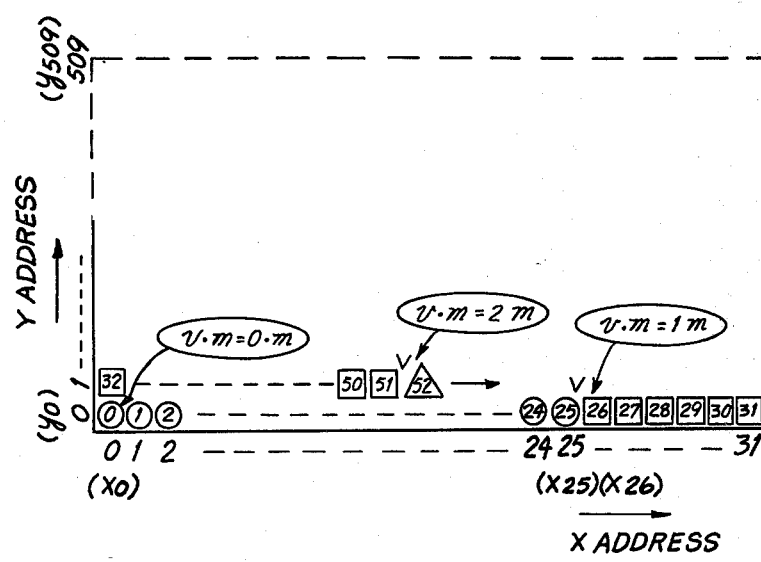

FIG. 4(a) illustrates a conventional memory address updating scheme for the two-dimensional addresses of H and V. The vertical address for the memory changes every scanning line. In FIG. 4(b), serial numbers are assigned as memory addresses in accordance with the order for storing the data in memory and there is also illustrated a technique to convert the two-dimensional addresses into a one-dimensional continuous address, 0 to 16328, of 14 bits.

Comparing FIG. 4(a) with FIG. 4(b), and in particular referring to the imaginary coordinate of X and y in FIG. 4(b), it can be seen that the lower 5 bits of the 14-bit one-dimensional continuous address is selected for the abscissa the upper 9 bits for the ordinate, and the increase of the imaginary ordinate address in FIG. 4(b) progressively reduces. To accomplish this, the vertical address from the address generator is multiplied by a vertical address multiplier to be increased by m, which is the horizontal address number to be changed within one scanning line. Further, the output signal from the multiplier is loaded into the memory address counter during the period of the horizontal pulse and the memory address counter is changed during the period of the memory card selecting counter.

The principle of operation discussed above will now be described by referring to the comparative illustrations of FIGS. 4(a) and (b). The conversion of the two-dimensional addresses of H and V into the imaginary one-dimensional continuous address is equivalent to that in FIG. 4(a), the h address blocks 0 to 25 at vo are arranged in a line, being followed by the h address blocks 26 to 51 at v1. When the new abscissa address is 5 bits, it is equivalent, in FIG. 4(b), to an address construction comprising a series of addresses 0 to 16328 (14 bits) divided into blocks, each block including the 5-bit maximum value, i.e 32 from 0 to 31, for example, and the blocks are stacked in new ordinates of Y addresses y0, y1, . . . , y509 (9 bits), as shown in FIG. 4(b).

Figure 5:
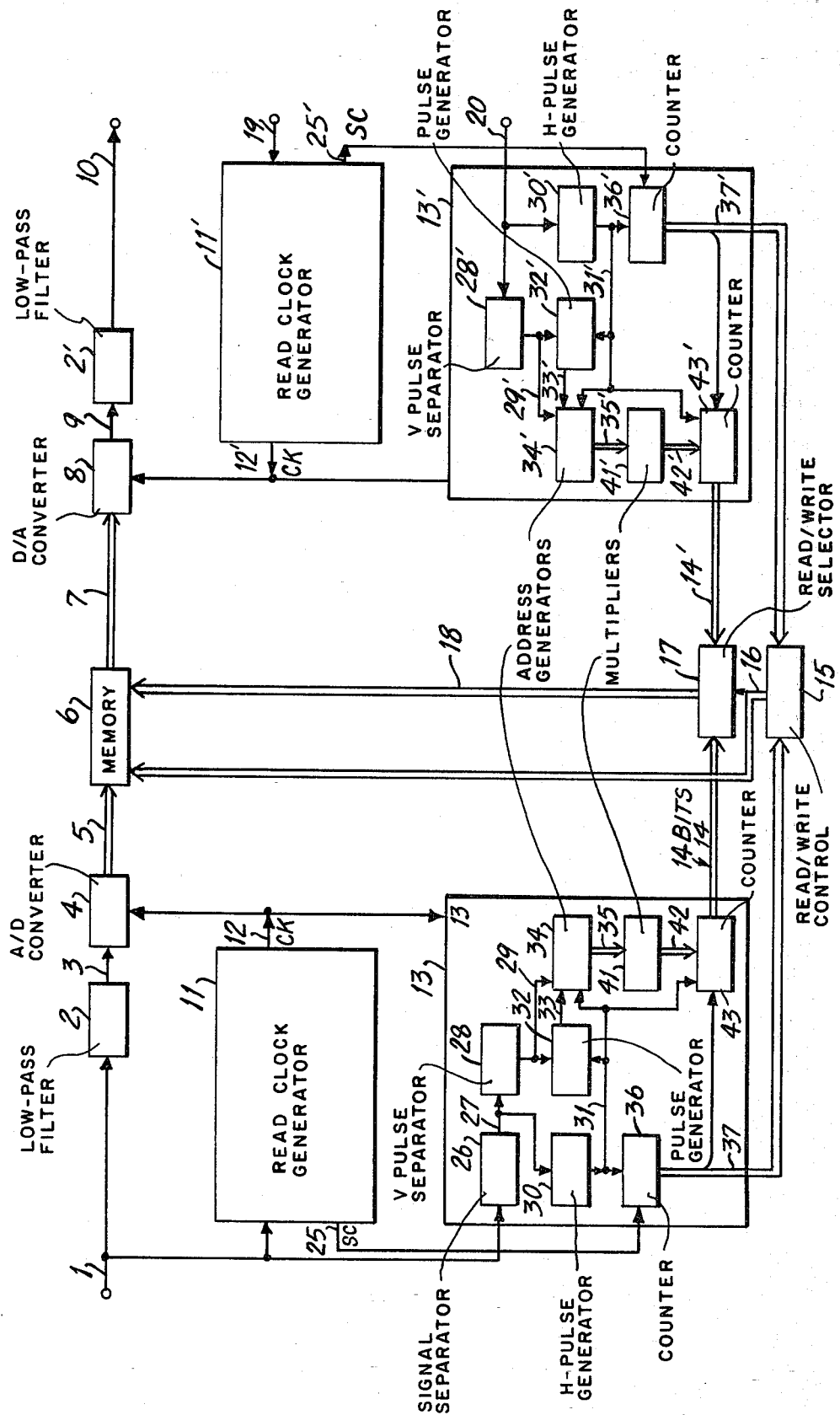
FIG. 5 is a block diagram of one embodiment of the present invention.

Referring to FIG. 5, vertical address data on signalling path 35, from vertical address generator 34, is multiplied by m(26) in a vertical address multiplier 41 thereby forming an initial value for write-in start address data on signalling path 42 for each scanning line, that is, an initial value for each H start address. The H start address data on signalling path 42 is given by v×m where v is vertical address data on signalling path 35 and m is an address change value necessary for the H write-in operation.

Referring to FIG. 4(b), and taking the case of the vertical address vo, since the horizontal write-in addresses are from 0 to 25, the address change value necessary for writing within vo is 26. Then, each H start address on signalling path 42 is loaded as "load data" into the write-in memory address counter 43 by a H pulse on signalling path 31 for determining the write start phase of each H from an H pulse generator 30. The memory address counter 43, having the write-in start address initial value of each H loaded at the start phase of each H successively changes, one by one, the write-in memory address on signalling path 14 at the period of the most significant bit of a card selecting address on signalling path 37 providing a cycle of memory card operation sequences from memory card selecting counter 36. The read memory address 14' is formed in a similar manner.

Figure 6:
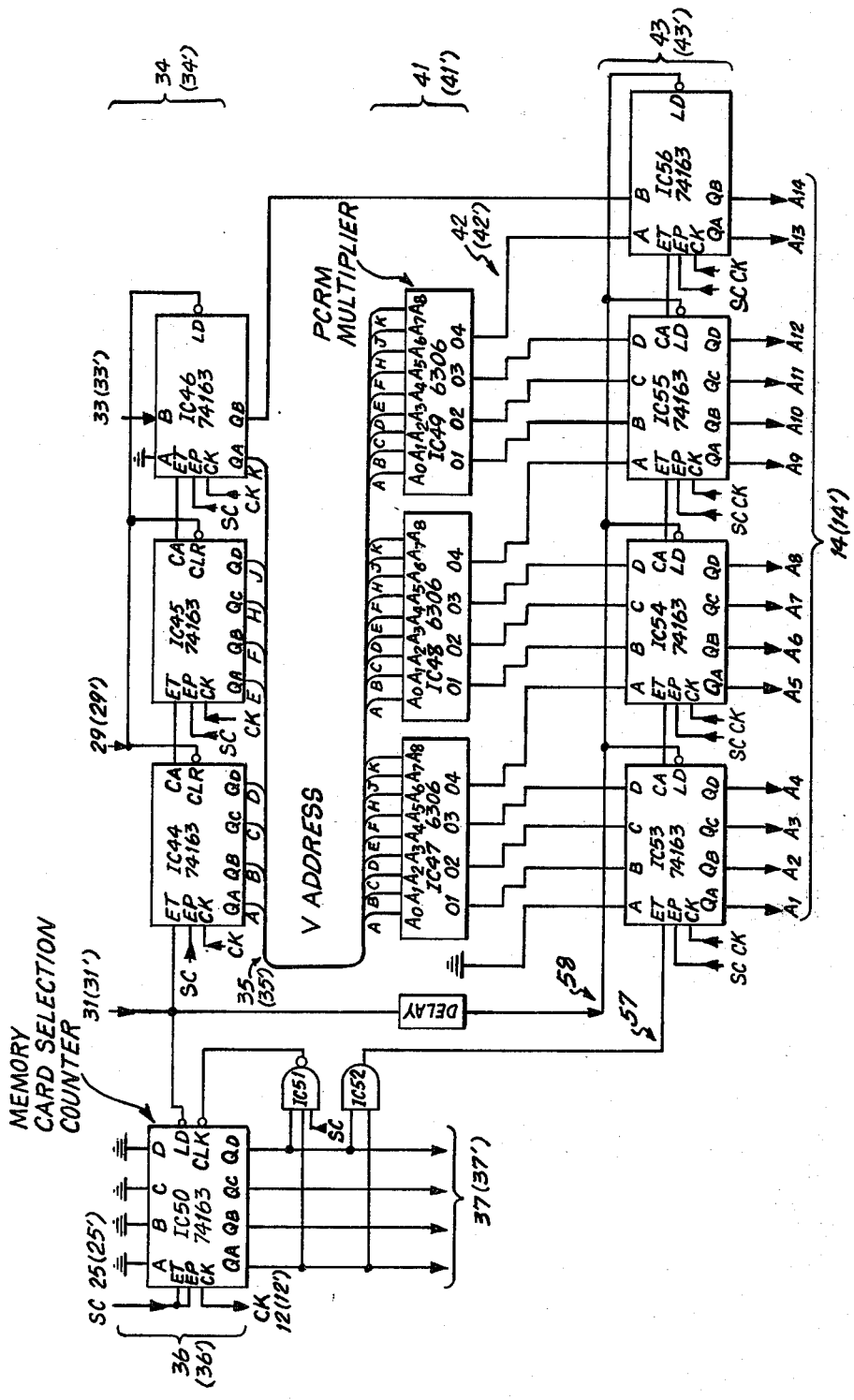
FIG. 6 is a circuit diagram illustrating the details of one portion of the embodiment shown in FIG. 5.

FIG. 6 shows a detailed circuit diagram of one portion of one embodiment of the present invention. The vertical address on signalling path 35 (35') is formed by the vertical address generator 34 (34') comprised of counters IC44 to 46.

A multiplier comprised of a PROM (programmable read only memory), embodied in IC47 to IC49, first increases the vertical address on signalling path 35 (35') by 13 times and further shifts the output by one bit to double it. The result is 13×2=26. A memory card selection counter 36 (36'), comprised of a counter IC50 and a decoder IC51, cooperate to form a memory card selecting address on signalling path 37 (37'). The memory card selecting counter 36 (36') and decoder IC52 cooperatively form a count enable pulse on path 57. Write-in start address data on path 42, for each H is loaded as an initial value into the memory address counter 43 (43') comprised of ICs 53 to 56 in response to a load control pulse on path 58 formed from the H pulse on path 31 (31'). By the count enable pulse on path 57 of the period corresponding to 10 subcarriers, the memory address on signalling path 14 (14') formed by the memory address counter 43 (43') progressively changes one by one.

Generally, most of the horizontal blanking period of each H does not require storage. In the present embodiment, 5.4 μs (=64.0−58.6) is a no-store period. Even in the no-store period, the memory address data on signalling path 14 (14') is counted up, so that the load returns it to the normal start address.

As described above, the present invention uses the vertical address generator, the vertical address multiplier, the memory block (card) selecting counter, and the memory address counter, thereby advantageously reducing the number memory address bits and minimizing memory capacity.

Although a specific embodiment of this invention has been shown and described, it will be understood that various modifications may be made without departing from the spirit of this invention.

What is claimed is:

1. A storage system for a color television signal, said color television signal including horizontal and vertical synchronizing signals and a color subcarrier, said system comprising:
   memory means responsive to write-in address data for storing said color television signal, said memory means including a plurality of memory blocks;
   means responsive to said horizontal and vertical synchronizing signals and said color subcarrier for producing said write-in address data; and
   means for producing read-out address data, the stored television signal being read out in response to said read-out address data;
   said write-in address data producing means including:
   means responsive to said vertical synchronizing signal for producing write-in vertical address data:

means for multiplying said write-in vertical address data by a predetermined amount;

memory-block selecting counter means for producing memory-block selecting data, said television signal being written into a particular memory block selected by said memory-block selecting data; and memory address counter means for loading output data from said multiplying means at a rate equal to a period of said horizontal synchronizing signal and for counting memory addresses at a rate equal to a period of said memory-block selecting counter.

2. A storage system for a color television signal said color television signal including a horizontal synchronizing signal, a vertical synchronizing signal and a color subcarrier, said system comprising, a memory for storing said color television signal in response to a write-in address, said memory being divided into a plurality of memory blocks, means for producing a read-out address, the stored television signal being read out from said memory in response to said read-out address, means for producing a write-in start vertical address, means for multiplying said write-in start vertical address by a predetermined amount, means for producing a memory block selection signal, and means responsive to said memory block selection signal and to said multiplied write-in start vertical address for producing said write-in address.

3. A storage system for a color television signal in accordance with claim 2 wherein said write-in address producing means includes means for successively changing one by one, said write-in address at a rate equal to a period of said memory block selection signal producing means.

4. A storage system in accordance with claim 3 wherein said write-in address producing means are loaded with said multiplied write-in start vertical address at a rate equal to a period of said horizontal synchronizing signal.

5. A storage system in accordance with claim 2 wherein said predetermined amount is equal to 26.

* * * * *